United States Patent
Lin et al.

(10) Patent No.: US 10,682,208 B2
(45) Date of Patent: Jun. 16, 2020

(54) ABUTMENT ASSEMBLY AND MANUFACTURING METHOD THEREOF

(71) Applicant: CHILIAD BIOMEDICAL TECHNOLOGY CO., LTD., Taichung (TW)

(72) Inventors: Chun-Jung Lin, Taichung (TW); Hsin-Yu Liu, Taichung (TW)

(73) Assignee: CHILIAD BIOMEDICAL TECHNOLOGY CO., LTD., Taichung (TW)

( * ) Notice: Subject to any disclaimer, the term of this patent is extended or adjusted under 35 U.S.C. 154(b) by 330 days.

(21) Appl. No.: 15/686,110

(22) Filed: Aug. 24, 2017

(65) Prior Publication Data
US 2018/0055606 A1 Mar. 1, 2018

(30) Foreign Application Priority Data
Aug. 31, 2016 (CN) ...................... 2016 2 1015322 U

(51) Int. Cl.
*A61C 8/00* (2006.01)
*A61C 1/08* (2006.01)
*A61C 13/225* (2006.01)

(52) U.S. Cl.
CPC ................ *A61C 8/00* (2013.01); *A61C 8/005* (2013.01); *A61C 1/084* (2013.01); *A61C 8/0013* (2013.01); *A61C 8/0016* (2013.01); *A61C 8/0048* (2013.01); *A61C 8/0053* (2013.01); *A61C 13/225* (2013.01)

(58) Field of Classification Search
CPC ...... A61C 8/0048; A61C 8/005; A61C 8/0051; A61C 8/006
See application file for complete search history.

(56) References Cited

U.S. PATENT DOCUMENTS

| 4,780,080 | A | * | 10/1988 | Haris | A61C 8/0022 433/173 |
| 5,104,318 | A | * | 4/1992 | Piche | A61C 8/0068 433/173 |
| 5,259,759 | A | * | 11/1993 | Jorneus | A61C 8/0048 433/173 |
| 5,316,477 | A | * | 5/1994 | Calderon | A61C 8/0069 433/172 |
| 8,113,835 | B2 | * | 2/2012 | Yau | A61C 8/005 433/173 |

(Continued)

*Primary Examiner* — Ralph A Lewis
(74) *Attorney, Agent, or Firm* — CKC & Partners Co., LLC

(57) ABSTRACT

An abutment assembly includes an abutment, an adjustable buffer member and an adhesive. There is an angle between an extending direction of the abutment and a Z-axis direction, and the angle is greater than or equal to 0 degrees and smaller than or equal to 30 degrees. The adjustable buffer member is closely connected to the abutment having a positioning structure. The adjustable buffer member includes an engaging structure, an inner side wall, a base portion and a grinding portion. The engaging structure is engaged with the positioning structure. The inner side wall has at least one inner annular groove corresponding to the engaging structure. The base portion has a base thickness which is smaller than or equal to 4 mm. The adhesive is connected between the abutment and the adjustable buffer member, and contained in the inner annular groove. The grinding portion is manufactured by the instrument.

18 Claims, 16 Drawing Sheets

(56) References Cited

U.S. PATENT DOCUMENTS

| | | | | |
|---|---|---|---|---|
| 8,684,735 | B2* | 4/2014 | van Ophuysen | A61C 8/0054 |
| | | | | 433/173 |
| 9,055,988 | B2* | 6/2015 | Galgut | A61C 8/0001 |
| 2009/0130629 | A1* | 5/2009 | Towse | A61C 8/005 |
| | | | | 433/174 |
| 2010/0196852 | A1* | 8/2010 | Baruc | A61C 8/005 |
| | | | | 433/173 |

* cited by examiner

100d

100e

ABUTMENT ASSEMBLY AND MANUFACTURING METHOD THEREOF

RELATED APPLICATIONS

This application claims priority to China application No. 201621015322.4, filed on Aug. 31, 2016, which is herein incorporated by reference.

BACKGROUND

Technical Field

The present disclosure relates to an abutment assembly and a manufacturing method thereof. More particularly, the present disclosure relates to the abutment assembly and the manufacturing method thereof having a grinding or cutting operation to correct a position and direction of a crown.

Description of Related Art

A dental implant surgery provides various methods and apparatus for compensating for the loss of natural teeth. Dental implants are devices that are designed to be screwed into the human jawbone and serve as a mounting for a prosthetic in the shape and color of the tooth it is replacing. The primary advantage of implants over bridgework and partial dentures is that the installation is of a permanent nature and does not require the care, maintenance, comfort problems or adjustment associated with bridgework and dentures.

One conventional method is a single-stage dental restoration. The natural tooth can be replaced with a prosthetic tooth that is mounted on a unibody implant or a separate abutment secured to an implant. In the instance utilizing a separate implant and abutment, the implant is first installed in the patient's jawbone, typically through threaded engagement. A separate abutment is then secured to the coronal end of the implant and, after sufficient osseointegration of the implant with the patient's jawbone, the prosthetic tooth is secured to the abutment. In the single-stage dental restoration, the implant is installed into the patient's jaw bone and allowed sufficient time to osseointegrate. After a period of time, the prosthetic tooth is installed on the coronal end of the unibody implant.

Another conventional method is a two-stage dental restoration having a first stage and a second stage. In the first stage, a dental implant in inserted in the jawbone of a dental patient in the location of the natural root of the lost tooth. After the first stage surgery, the implant is left in position in the jawbone, covered by the patient's fleshy gum tissue, for several months until it becomes osseointegrated within the patient's jawbone. Thereafter, in the second stage, the gum tissue is opened to expose an end of the implant, and a healing abutment is attached to the implant until the surrounding gum tissue heals around the abutment. After the gum tissue has healed, the healing abutment is typically removed and the implant is available to support an artificial tooth. However, because of the features of the jaw, or because of a hole being drilled at an angle in the jaw, it may also be necessary to fit an angled abutment. Even after satisfactory implantation of an implant, it is inevitable that corrections of a greater or lesser degree will have to be made by grinding the abutment so as to ensure that a crown mounted thereon fit properly. Unfortunately, the grinding of the abutment has the effect that the abutment becomes too thin in places, which is difficult for the dentist to discern visually. In addition, the probability of the abutment being broken will be increased by grinding the abutment. Consequently, the overall stability is no longer guaranteed, and this may lead to a fracture when a load is applied. Therefore, an abutment assembly and a manufacturing method thereof having the features of stable connection, long lifetime and conveniently correcting directions are commercially desirable.

SUMMARY

According to one aspect of the present disclosure, an abutment assembly disposed on an implant and manufactured by an instrument includes an abutment, an adjustable buffer member and an adhesive. The abutment includes a positioning structure, an upper connecting portion, a lower connecting portion and an interlinking portion. The positioning structure is disposed outside of the upper connecting portion. The interlinking portion is connected between the upper connecting portion and the lower connecting portion. The lower connecting portion is detachably connected to the implant. There is an angle between an extending direction of the abutment and a Z-axis direction, and the angle is greater than or equal to 0 degrees and smaller than or equal to 30 degrees. The adjustable buffer member is closely connected to the positioning structure and the upper connecting portion. The adjustable buffer member includes an engaging structure, an inner side wall, a base portion and a grinding portion. The engaging structure is disposed on the inner side wall and engaged with the positioning structure. The inner side wall is connected to the upper connecting portion and has at least one inner annular groove corresponding to the engaging structure. The base portion is connected to the grinding portion and disposed on the interlinking portion, and the base portion has a base thickness which is greater than 0 mm and smaller than or equal to 4 mm. The adhesive is connected between the abutment and the adjustable buffer member. The adhesive is contained in the inner annular groove, and closely connected to the inner side wall, the upper connecting portion and the interlinking portion. The grinding portion of the adjustable buffer member is manufactured by the instrument, and the adjustable buffer member is positioned on the abutment via the positioning structure, the adhesive and the inner annular groove.

According to another aspect of the present disclosure, an abutment assembly disposed on an implant and manufactured by an instrument includes an abutment, an adjustable buffer member and an adhesive. The abutment includes a positioning structure, an upper connecting portion, a lower connecting portion and an interlinking portion. The positioning structure is disposed outside of the upper connecting portion. The interlinking portion is connected between the upper connecting portion and the lower connecting portion. The lower connecting portion is detachably connected to the implant. There is an angle between an extending direction of the abutment and a Z-axis direction, and the angle is greater than or equal to 0 degrees and smaller than or equal to 30 degrees. The adjustable buffer member is closely connected to the positioning structure and the upper connecting portion. The adjustable buffer member includes a grinding region, an engaging structure, an inner side wall, a base portion and a grinding portion. The grinding region is spaced a tolerance distance from the abutment. The engaging structure is disposed on the inner side wall and engaged with the positioning structure. The inner side wall is connected to the upper connecting portion and has at least one inner annular groove corresponding to the engaging structure. The base portion is connected to the grinding portion and disposed on the interlinking portion, and the base portion has a base thickness which is greater than 0 mm and smaller than or equal to 4 mm. The adhesive is disposed between the abutment and the adjustable buffer member. The adhesive is contained in the inner annular groove, and closely connected to the inner side wall, the upper connecting portion and the interlinking portion. The grinding portion of the adjustable buffer member is manufactured by the instrument. The adjustable buffer member is positioned on the abutment via the positioning structure, the adhesive and the inner annular groove. The tolerance distance is greater than 0 mm.

According to further another aspect of the present disclosure, a manufacturing method of the abutment assembly provides a first positioning step, a grinding step and a second positioning step. The first positioning step is for closely connecting the engaging structure of the adjustable buffer member to the positioning structure of the abutment so as to position the adjustable buffer member on the abutment. The grinding step is for grinding the grinding portion of the adjustable buffer member by the instrument. The second positioning step is for closely connecting a crown to the adjustable buffer member by a binder so as to position the crown on the adjustable buffer member.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
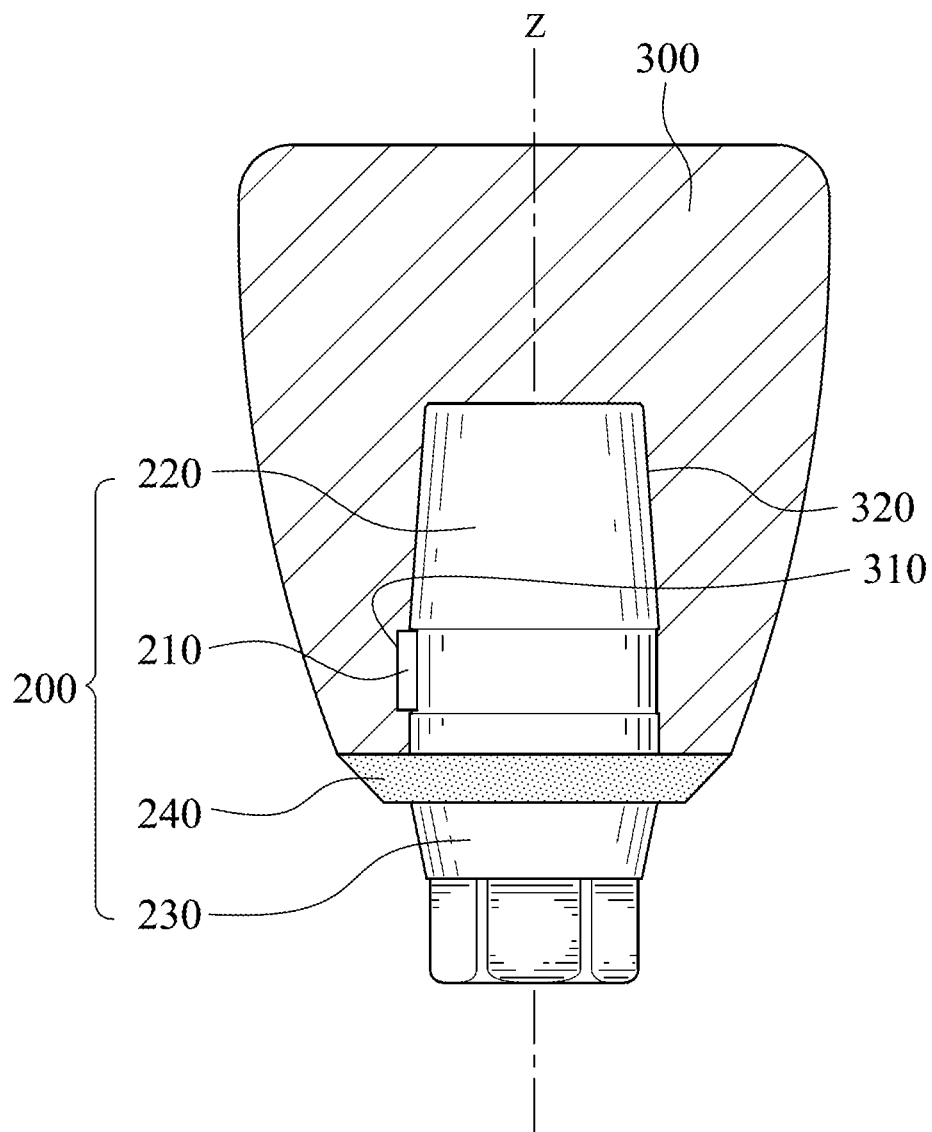
FIG. 1A shows a schematic view of an abutment assembly before grinding according to one embodiment of the present disclosure.
Figure 1B:
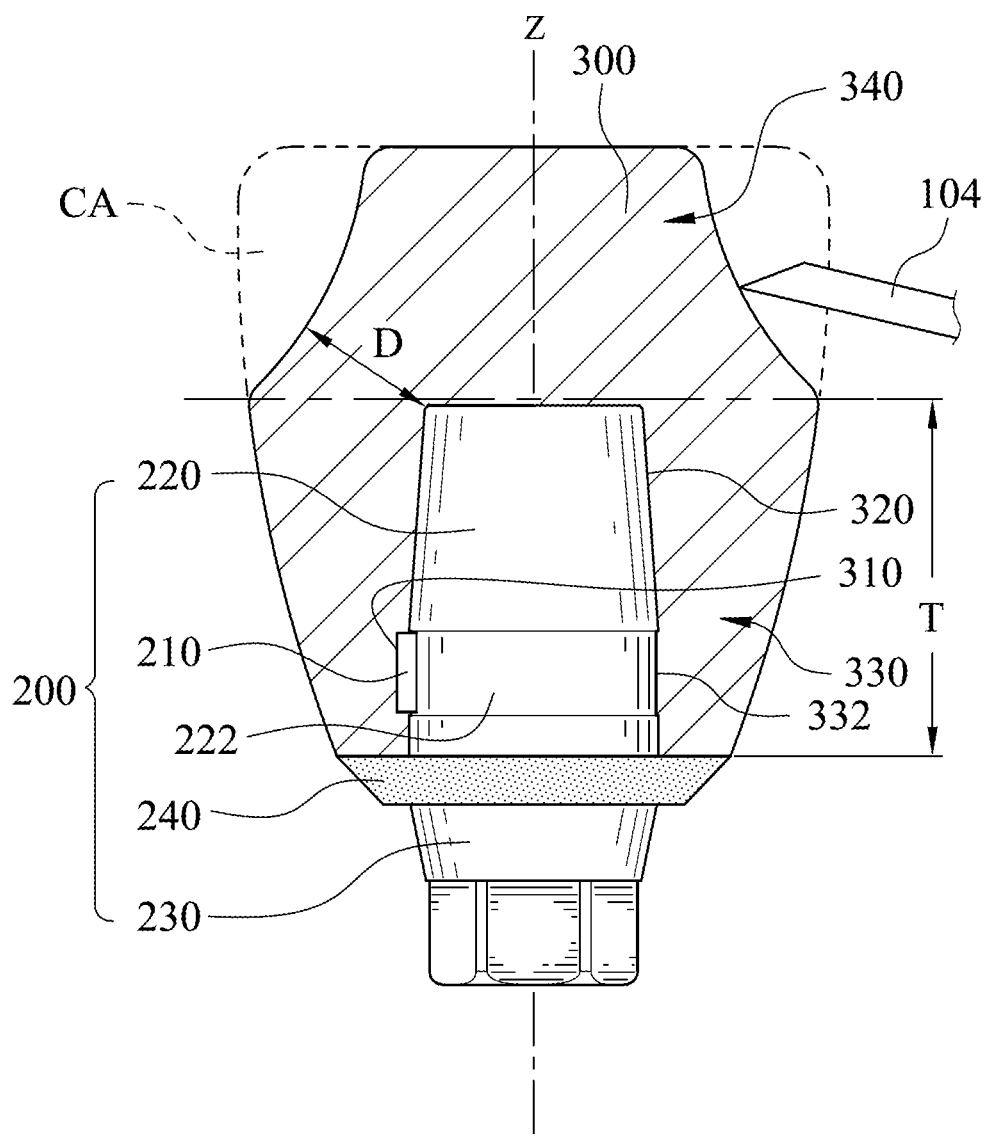
FIG. 1B shows a schematic view of the abutment assembly of FIG. 1A after grinding.
Figure 4A:
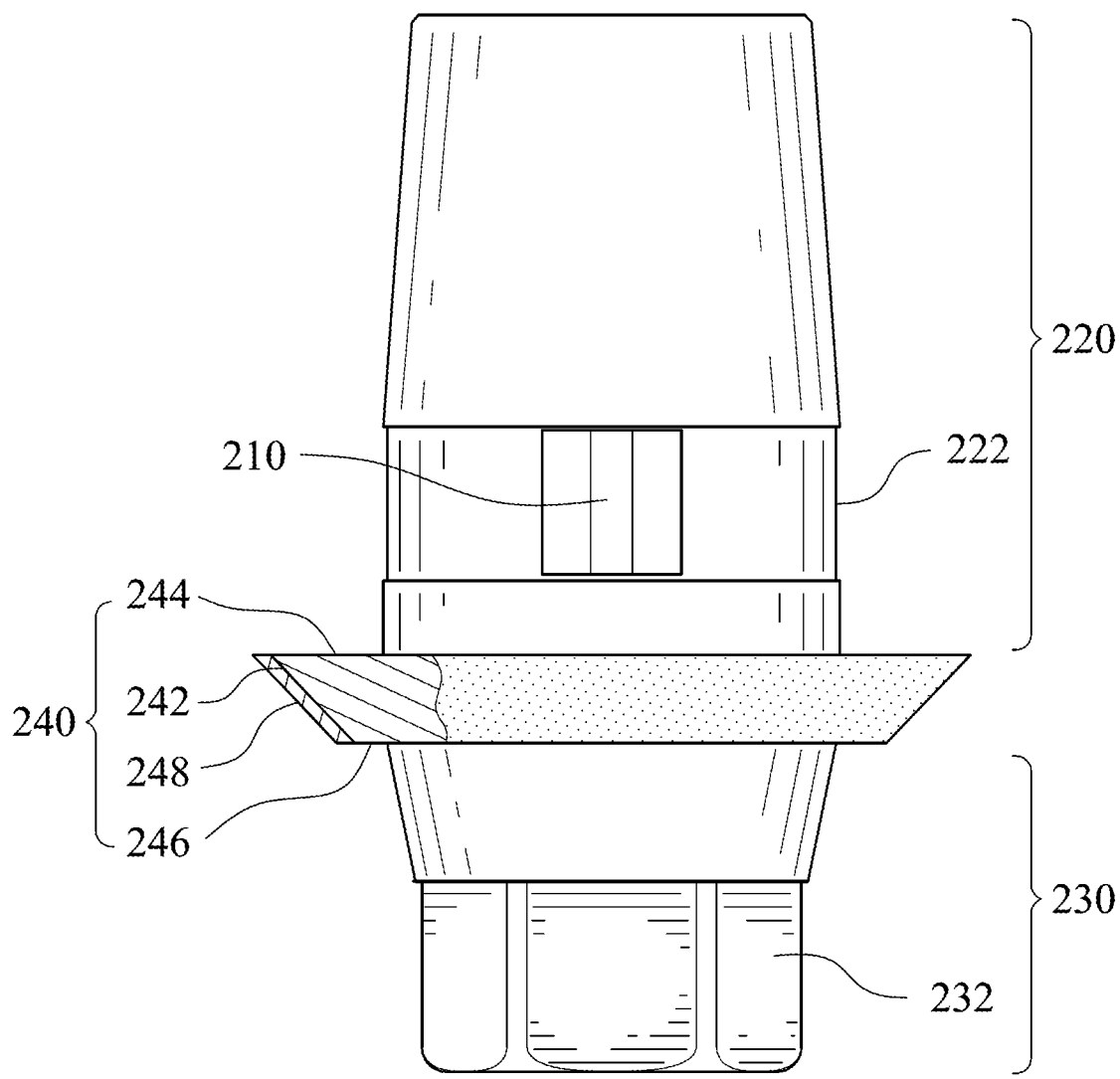
FIG. 4A shows a schematic view of an abutment of the abutment assembly of FIG. 1A.
Figure 4B:
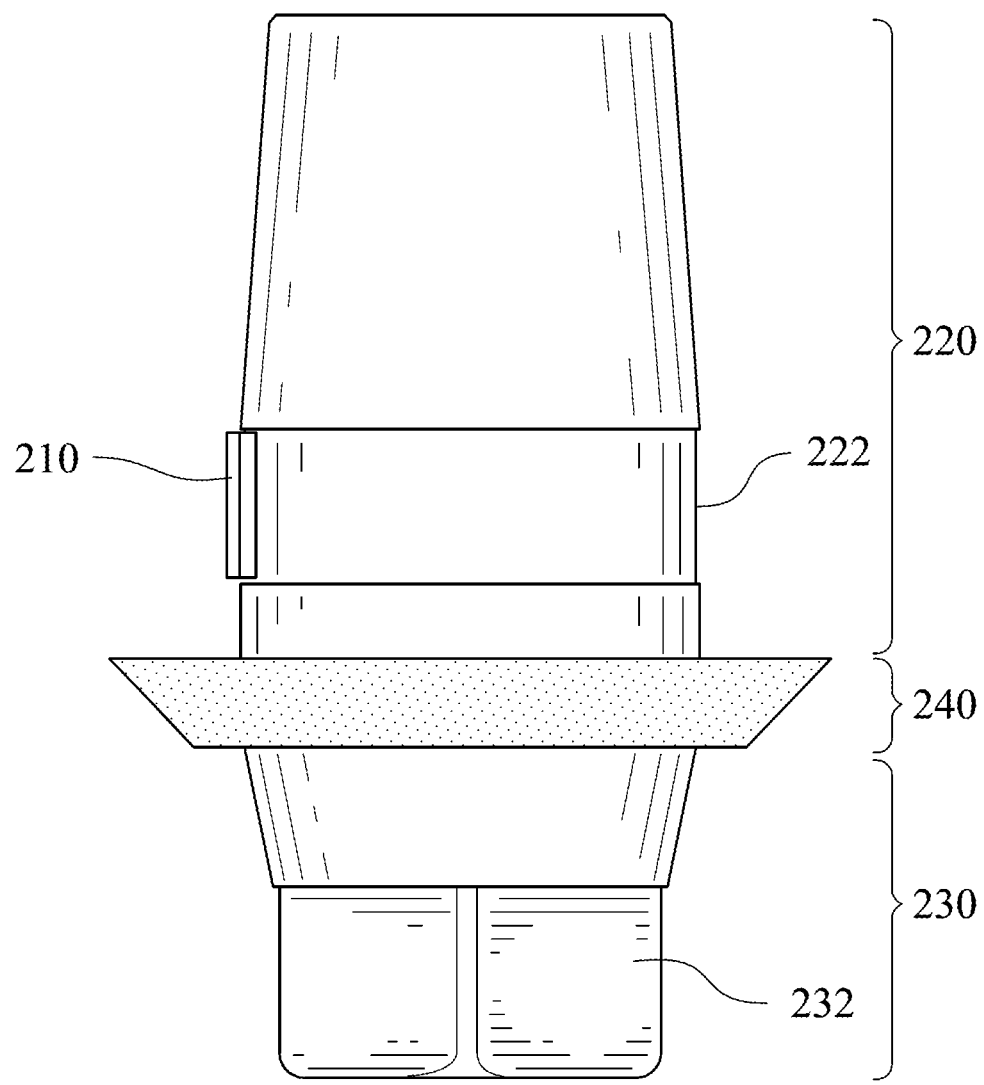
FIG. 4B shows a schematic side view of the abutment of FIG. 4A.
Figure 4C:
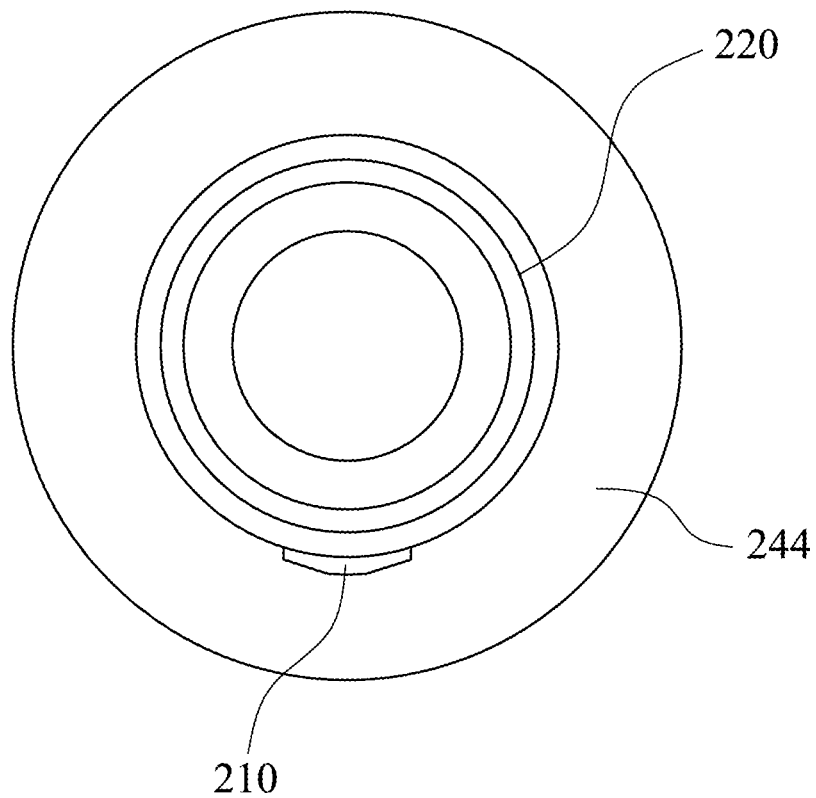
FIG. 4C shows a schematic top view of the abutment of FIG. 4A.

FIG. 1A shows a schematic view of an abutment assembly 100 before grinding according to one embodiment of the present disclosure; FIG. 1B shows a schematic view of the abutment assembly 100 of FIG. 1A after grinding; FIG. 4A shows a schematic view of an abutment 200 of the abutment assembly 100 of FIG. 1A; FIG. 4B shows a schematic side view of the abutment 200 of FIG. 4A; and FIG. 4C shows a schematic top view of the abutment 200 of FIG. 4A. The abutment assembly 100 is disposed on an implant 102 and manufactured by an instrument 104. The abutment assembly 100 includes the abutment 200 and an adjustable buffer member 300.

The abutment 200 includes a positioning structure 210, an upper connecting portion 220, a lower connecting portion 230 and an interlinking portion 240. The positioning structure 210 is disposed outside of the upper connecting portion 220. The upper connecting portion 220 is connected to the lower connecting portion 230 via the interlinking portion 240. The lower connecting portion 230 is detachably connected to the implant 102. The interlinking portion 240 is connected between the upper connecting portion 220 and the lower connecting portion 230. In detail, the number of the positioning structure 210 may be one or more structures. In FIGS. 1A and 1B, one positioning structure 210 is connected to the upper connecting portion 220. The positioning structure 210 has a convex shape, and protrudes from an outer surface of the upper connecting portion 220 for engaging with an inner surface of the adjustable buffer member 300. The interlinking portion 240 includes an outer side surface 242, an upper surface 244, a lower surface 246 and a coating layer 248. The coating layer 248 is disposed outside the outer side surface 242, the upper surface 244 and the lower surface 246. The coating layer 248 has a gold color which is similar to the color of the gum 106, thereby achieving an aesthetic effect without an unexpected feeling. The coating layer 248 may be made of various kinds of medical compounds. In FIG. 4A, the coating layer 248 is made of a titanium compound to achieve an antibacterial effect. In addition, the upper connecting portion 220 has a cylindrical shape and a recess 222 adjacent to the interlinking portion 240. The positioning structure 210 is disposed in the recess 222. The lower connecting portion 230 has an implant connecting portion 232 corresponding to the shape of an inner hole of the implant 102. The interlinking portion 240 has a circular shape. The upper surface 244 and the lower surface 246 have an upper diameter and a lower diameter, respectively. The upper diameter is greater than the lower diameter, so that the interlinking portion 240 can be stably connected to the adjustable buffer member 300.

The adjustable buffer member 300 is closely connected to the positioning structure 210 and the upper connecting portion 220. The adjustable buffer member 300 includes an engaging structure 310, an inner side wall 320, a base portion 330 and a grinding portion 340. The engaging structure 310 is disposed on the inner side wall 320. The positioning structure 210 has the convex shape, and the engaging structure 310 has a concave shape so as to engage with the positioning structure 210. The inner side wall 320 is connected to the upper connecting portion 220. The base portion 330 is connected to the grinding portion 340 and disposed on the interlinking portion 240. The base portion 330 has a base thickness T which is greater than 0 mm and smaller than or equal to 4 mm. Due to different depths of the implant 102 inserted into the gum 106, the different base thicknesses T are required to allow the crown 400 to perfectly communicate with the gum 106. The grinding portion 340 of the adjustable buffer member 300 is adaptively manufactured by the instrument 104 to correct a position and direction of a crown 400 connected to the adjustable buffer member 300. The adjustable buffer member 300 is positioned on the abutment 200 via the positioning structure 210. Moreover, the adjustable buffer member 300 is made of a medical material selected from the group consisting of Polymethylmethacrylate (PMMA) and Polyetheretherketone (PEEK). The hardness of the adjustable buffer member 300 is much lower than the hardness of metal so as to be easily grinded or cut by the instrument 104. The instrument 104 is made of metal and may be a blade (shown in FIG. 1B) or a drill (shown in FIG. 7A). In FIG. 1B, the adjustable buffer member 300 further includes a grinding region CA removed by the instrument 104. The inner side wall 320 has a convex annular portion 322 correspondingly connected to the recess 222 of the abutment 200, thus preventing the adjustable buffer member 300 from moving along a Z-axis direction and stably connecting the adjustable buffer member 300 to the abutment 200. Furthermore, the color of the adjustable buffer member 300 is different from the color of the upper connecting portion 220. When an outer side wall of the adjustable buffer member 300 is near to the upper connecting portion 220 of the abutment 200 during grinding or cutting, the color of the adjustable buffer member 300 is changed according to a gradually decreasing distance between the adjustable buffer member 300 and the abutment 200, so that a physician can judge the approximate distance between the adjustable buffer member 300 and the abutment 200 according to the changing color. In other words, the grinding region CA is spaced a tolerance distance D from the abutment 200. The tolerance distance D is greater than 0 mm and smaller than 5 mm. Therefore, the adjustable buffer member 300 can be faced in the correct direction by grinding or cutting the outer side wall of the adjustable buffer member 300.

Figure 1C:
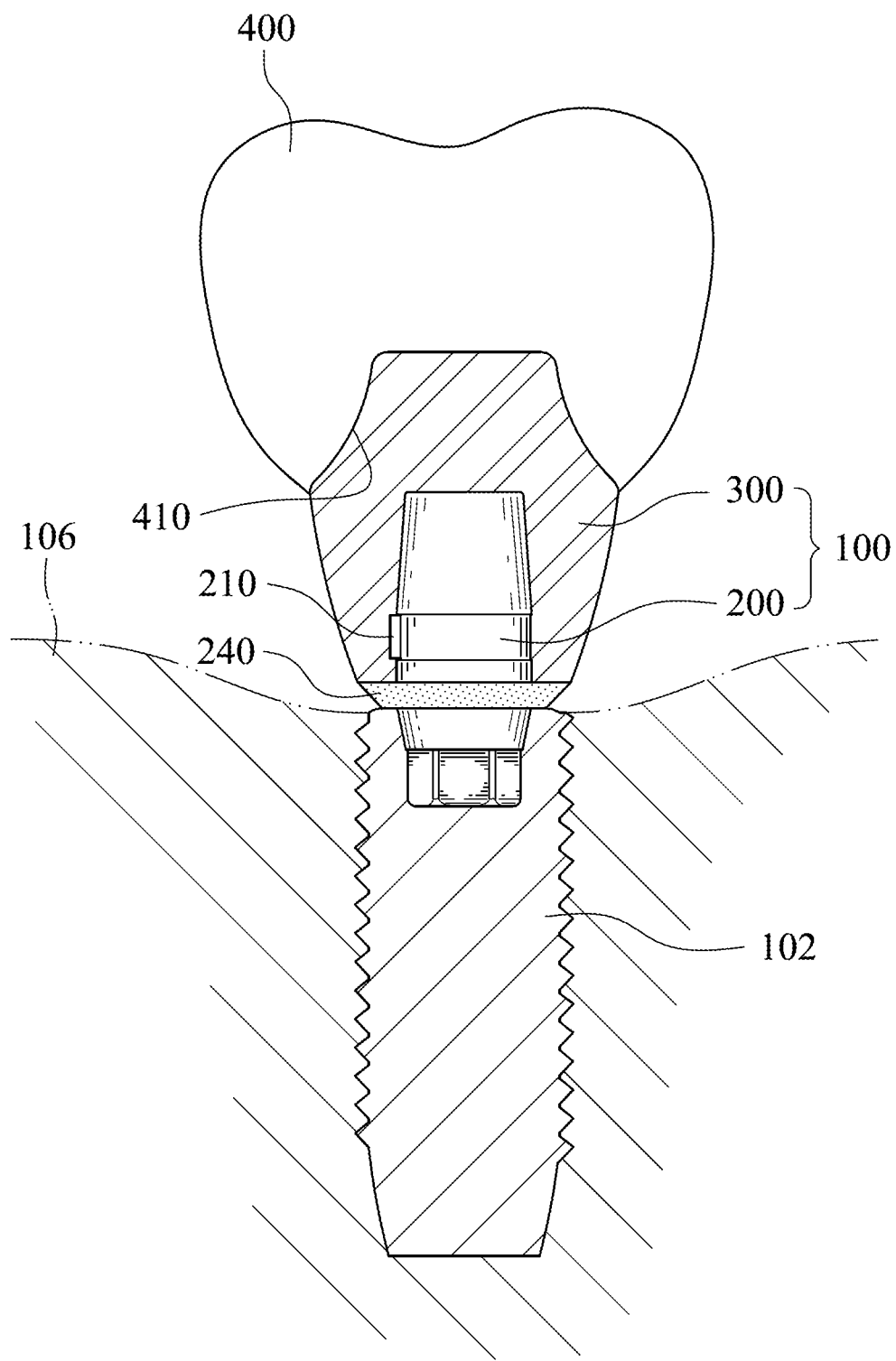
FIG. 1C shows a schematic view of a crown and the abutment assembly disposed on a vertical implant of FIG. 1B.
Figure 3:
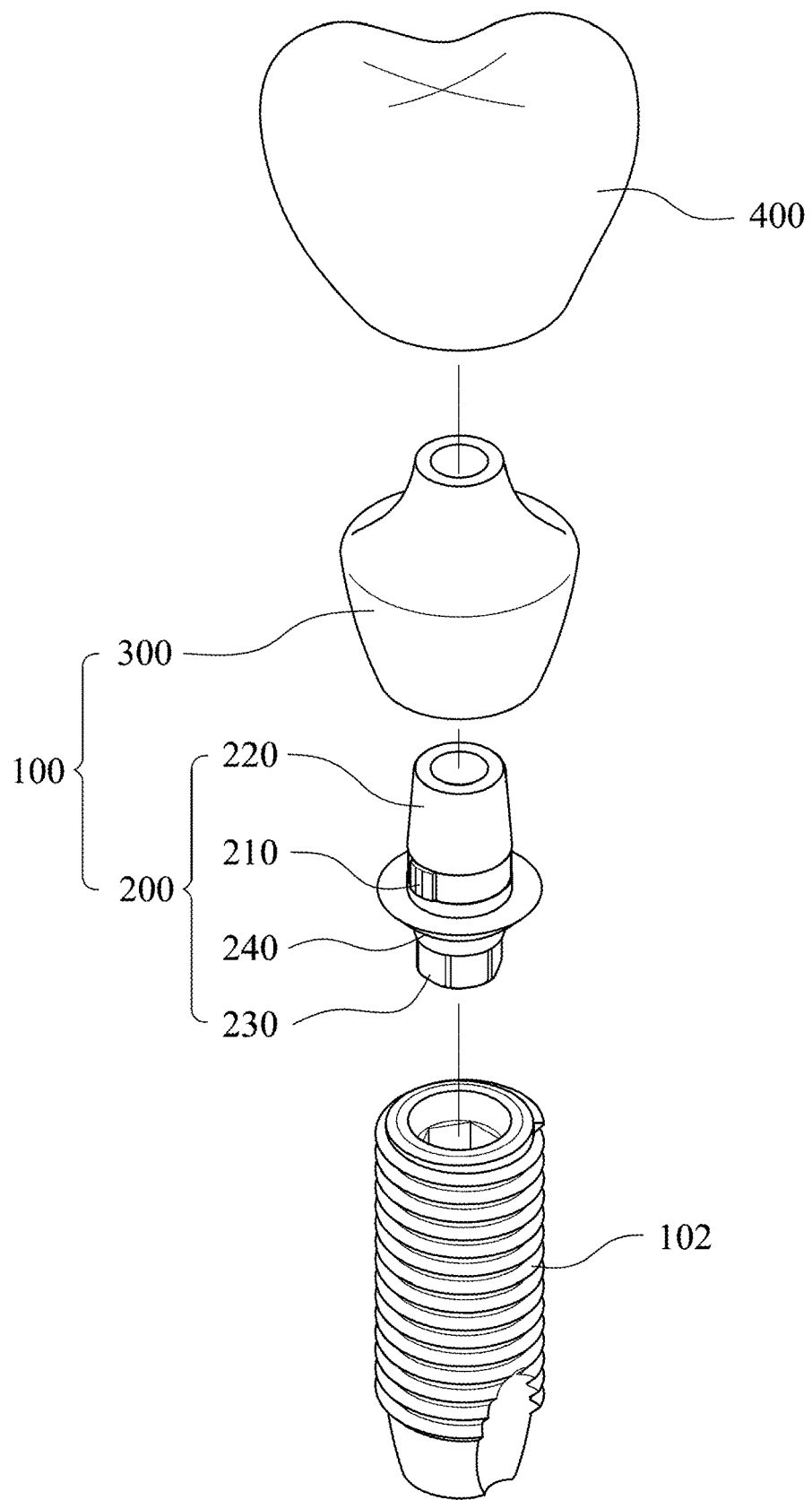
FIG. 3 shows an exploded view of the implant, the abutment assembly and the crown of FIG. 1C.

FIG. 1C shows a schematic view of a crown 400 and the abutment assembly 100 disposed on a vertical implant 102 of FIG. 1B; and FIG. 3 shows an exploded view of the implant 102, the abutment assembly 100 and the crown 400 of FIG. 1C. In FIGS. 1B, 1C and 3, the crown 400 covers the adjustable buffer member 300 and has a crown inner side surface 410. A shape of the crown inner side surface 410 is corresponding to a shape of an outer side wall 350 of the adjustable buffer member 300. A binder 600 is configured to connect between the crown inner side surface 410 and the adjustable buffer member 300, thus closely connecting to each other. In addition, it is obvious that the implant 102 and the abutment 200 cannot be seen from the outside, and the gum 106, the base portion 330 and the crown 400 can be seen from the outside.

Figure 2A:
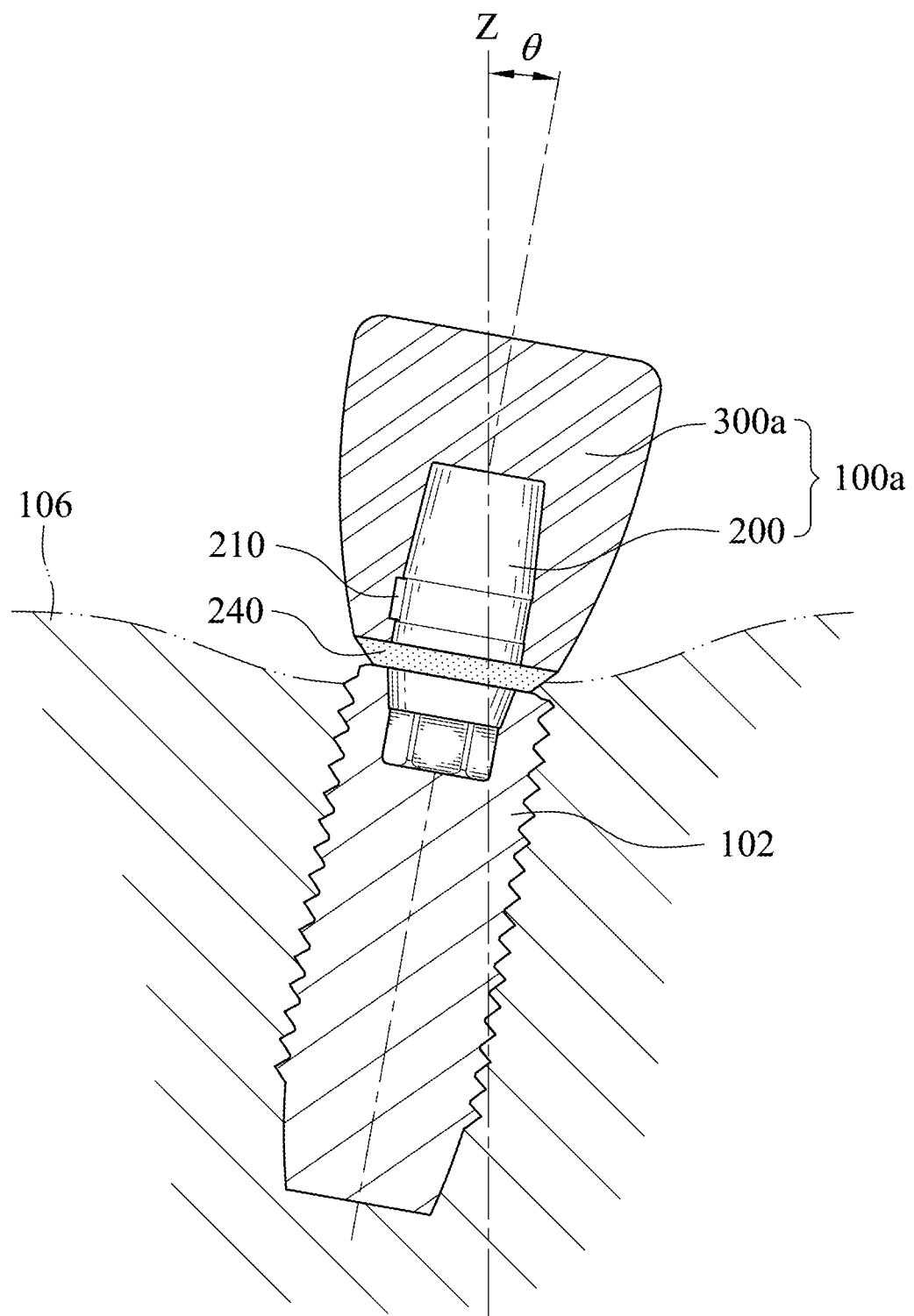
FIG. 2A shows a schematic view of an abutment assembly disposed on a tilted implant before grinding according to another embodiment of the present disclosure.
Figure 2B:
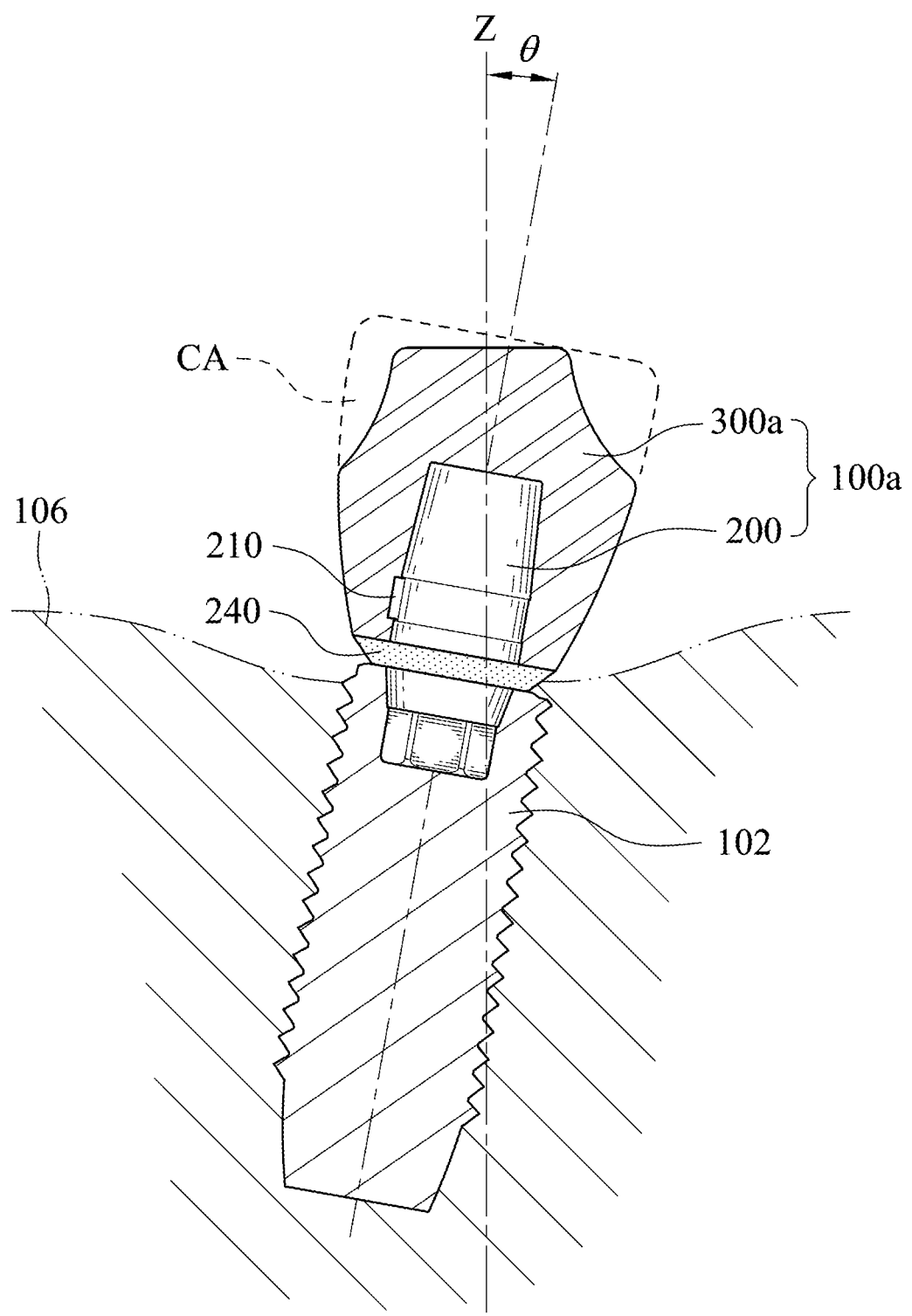
FIG. 2B shows a schematic view of the abutment assembly of FIG. 2A after grinding.
Figure 2C:
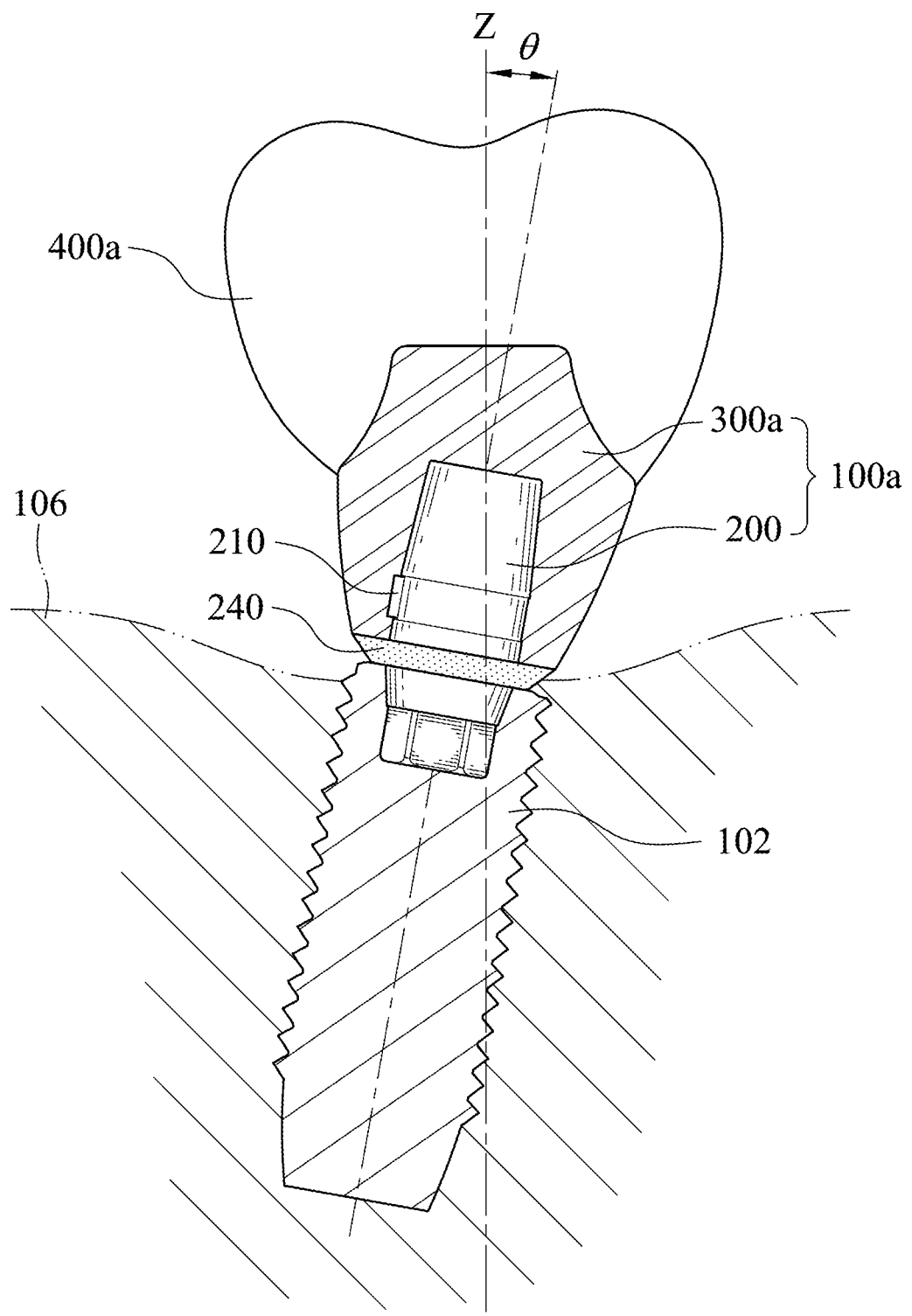
FIG. 2C shows a schematic view of the abutment assembly connected to a crown of FIG. 2B.

FIG. 2A shows a schematic view of an abutment assembly 100a disposed on a tilted implant 102 before grinding according to another embodiment of the present disclosure; FIG. 2B shows a schematic view of the abutment assembly 100a of FIG. 2A after grinding; and FIG. 2C shows a schematic view of the abutment assembly 100a connected to a crown 400a of FIG. 2B. In FIGS. 2A-2C, the abutment assembly 100a is formed in a skewed state. There is an angle θ between an extending direction of the adjustable buffer member 300a and a Z-axis direction, and the angle θ is greater than 0 degrees and smaller than or equal to 30 degrees. The Z-axis direction is perpendicular to a surface of the gum 106. In some embodiments, the angle θ may be 15 degrees, 23.5 degrees or 30 degrees. The abutment assembly 100a includes an abutment 200 and an adjustable buffer member 300a. In FIGS. 2A-2C, the detail of the abutment 200 is the same as the embodiment of FIGS. 1A-1C. In FIGS. 2A and 2B, the adjustable buffer member 300a includes a grinding region CA which is different from the grinding region CA in FIGS. 1A and 1B. In other words, the shape of the adjustable buffer member 300a of FIG. 2B after grinding is different from the shape of the adjustable buffer member 300 of FIG. 1B after grinding. The grinding region CA removed by the instrument 104 is used to form the grinding portion 340 corresponding to the Z-axis direction (i.e., the extending direction of the grinding portion 340 is parallel to the Z-axis direction), thereby correcting the direction of the crown 400. Hence, the crown 400a connected to the adjustable buffer member 300a of the present disclosure can smoothly apply the occlusal stress to the abutment 200, the gum 106 and the implant 102 to reduce the probability of the crown 400 and the abutment 200 being broken, thus increasing the lifetime of the crown 400 and the abutment 200.

Figure 5:
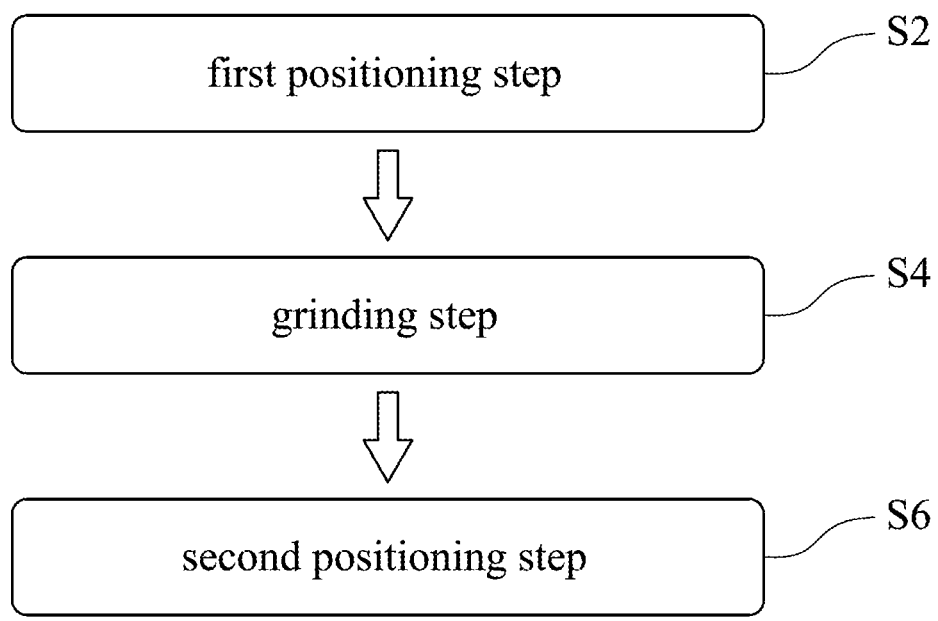
FIG. 5 shows a flow chart of a manufacturing method of an abutment assembly according to one embodiment of the present disclosure.

FIG. 5 shows a flow chart of a manufacturing method 700 of an abutment assembly 100, 100a according to one embodiment of the present disclosure. In FIGS. 1C, 2C and 5, the manufacturing method 700 provides a first positioning step S2, a grinding step S4 and a second positioning step S6. The first positioning step S2 is for closely connecting the engaging structure 310 of each of the adjustable buffer members 300, 300a to the positioning structure 210 of the abutment 200 so as to position each of the adjustable buffer members 300, 300a on the abutment 200. The grinding step S4 is for grinding or cutting the grinding portion 340 of each of the adjustable buffer members 300, 300a by the instrument 104. In the grinding step S4, each of the adjustable buffer members 300, 300a is positioned on the abutment 200 via the positioning structure 210 engaged with the engaging structure 310. The second positioning step S6 is for closely connecting each of the crowns 400, 400a to each of the adjustable buffer members 300, 300a by a binder 600 so as to position each of the crowns 400, 400a on each of the adjustable buffer members 300, 300a. Accordingly, each of the adjustable buffer members 300, 300a combined with a specific color of the coating layer 248 of the present disclosure can be used to compensate the angle θ between the extending direction of each of the adjustable buffer members 300, 300a and the Z-axis direction, thereby achieving a desired customized product and aesthetic effects. Moreover, each of the adjustable buffer members 300, 300a can be used to correct the direction of the crown 400 and avoiding shocking the abutment 200 and the implant 102. Each of the adjustable buffer members 300, 300a can be stably connected to the abutment 200 via the positioning structure 210 and the engaging structure 310.

Figure 6:
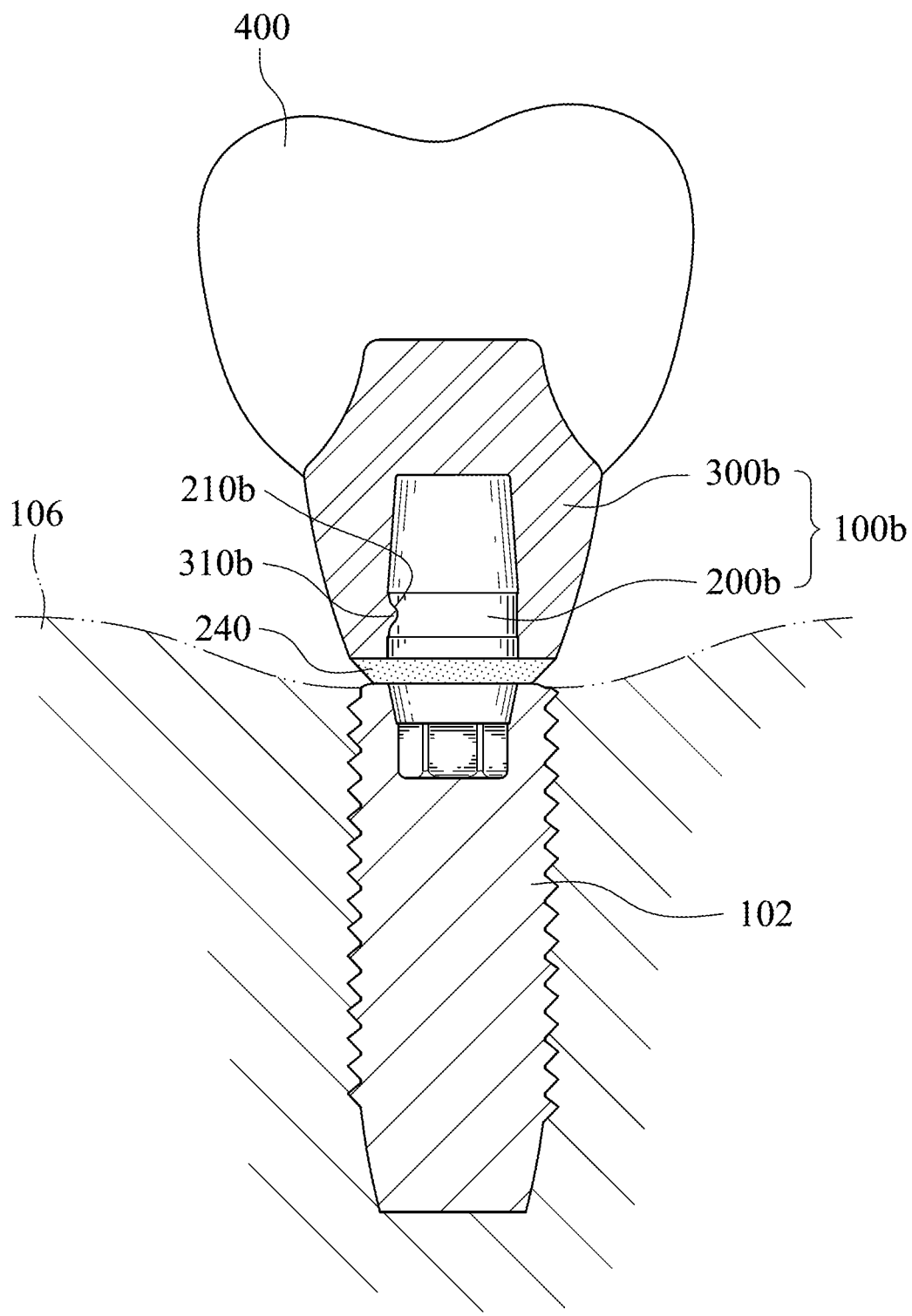
FIG. 6 shows a schematic view of an abutment assembly according to further another embodiment of the present disclosure.

FIG. 6 shows a schematic view of an abutment assembly 100b according to further another embodiment of the present disclosure. The abutment assembly 100b is connected between a crown 400 and an implant 102. The abutment assembly 100b includes an abutment 200b and an adjustable buffer member 300b. A positioning structure 210b of the abutment 200b has a concave shape, and an engaging structure 310b of the adjustable buffer member 300b has a convex shape so as to engage with the positioning structure 210b, thus preventing the adjustable buffer member 300b from moving along the Z-axis direction or rotating around the Z-axis.

In one embodiment, the positioning structure 210 of the abutment 200 may be a first threaded portion. The adjustable buffer member 300 includes the inner side wall 320 having a second threaded portion. The first threaded portion is correspondingly screwed into the second threaded portion. In other words, the engagement of the positioning structure 210 and the engaging structure 310 can reduce the relative displacement during grinding or cutting.

Figure 7A:
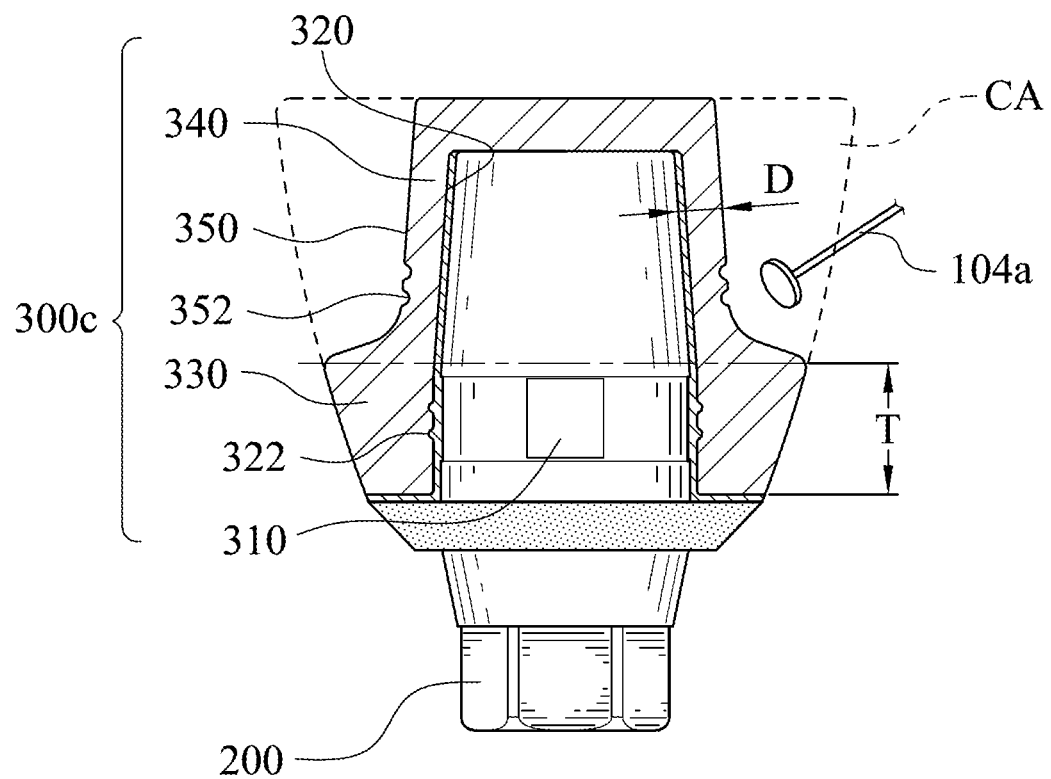
FIG. 7A shows a schematic view of an abutment assembly according to still further another embodiment of the present disclosure.
Figure 7B:
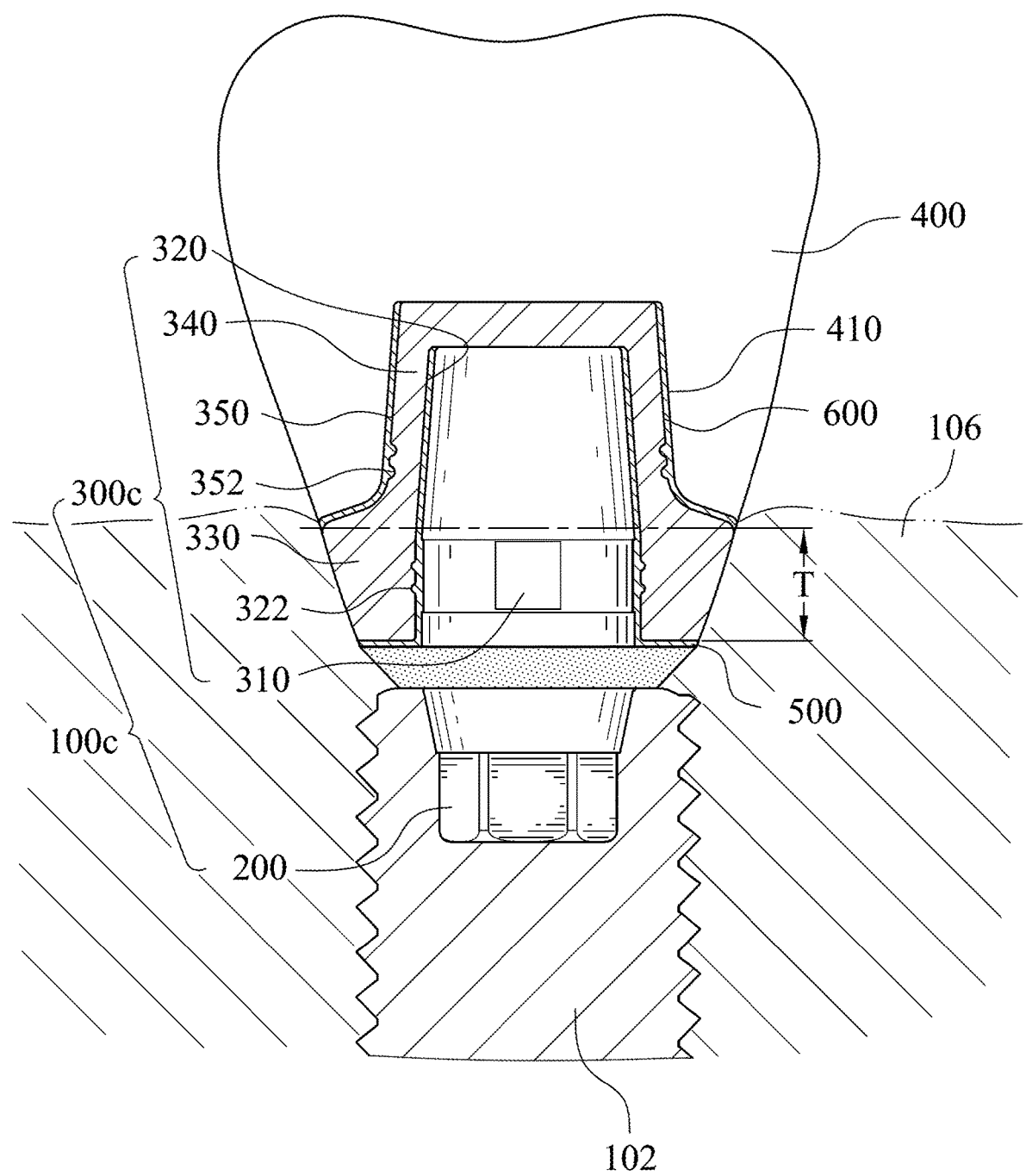
FIG. 7B shows a schematic view of the abutment assembly of FIG. 7A covered by a crown 400 and disposed on a vertical implant.

FIG. 7A shows a schematic view of an abutment assembly 100c according to still further another embodiment of the present disclosure; and FIG. 7B shows a schematic view of the abutment assembly 100c of FIG. 7A covered by a crown 400 and disposed on a vertical implant 102. The abutment assembly 100c disposed between the implant 102 and the crown 400. The abutment assembly 100c includes an abutment 200 and an adjustable buffer member 300c.

In FIGS. 7A and 7B, the detail of the abutment 200 is the same as the embodiment of FIGS. 1A-1C. The adjustable buffer member 300c is closely connected to the positioning structure 210 and the upper connecting portion 220. The adjustable buffer member 300c includes a grinding region CA, an engaging structure 310, an inner side wall 320, a base portion 330, a grinding portion 340 and an outer side wall 350. The grinding region CA is spaced a tolerance distance D from the abutment 200. The tolerance distance D is greater than 0 mm and smaller than 5 mm. The engaging structure 310 is disposed on the inner side wall 320 and engaged with the positioning structure 210. The inner side wall 320 is connected to the upper connecting portion 220 and has two inner annular grooves 322 corresponding to the engaging structure 310. The two inner annular grooves 322 are parallel to each other and are both communicated with the engaging structure 310. The base portion 330 is connected to the grinding portion 340 and disposed on the interlinking portion 240. The base portion 330 has a base thickness T which is greater than 0 mm and smaller than or equal to 4 mm. The outer side wall 350 includes two outer annular grooves 352 located at the outside of the grinding portion 340. The two outer annular grooves 352 are parallel to each other and perpendicular to the Z-axis direction. In addition, an adhesive 500 is disposed between the abutment 200 and the adjustable buffer member 300c. The adhesive 500 is contained in the two inner annular grooves 322, so that the adhesive 500 is closely connected to the inner side wall 320, the upper connecting portion 220 and the interlinking portion 240. The grinding portion 340 of the adjustable buffer member 300c is manufactured by the instrument 104. The adjustable buffer member 300c is suitably positioned on the abutment 200 via the positioning structure 210, the adhesive 500 and the two inner annular grooves 322. Moreover, the adjustable buffer member 300c is covered by a crown 400 having a crown inner side surface 410. A binder 600 is configured to connect between the crown inner side surface 410 and the adjustable buffer member 300c. The binder 600 is contained in the two outer annular grooves 352 to enhance the connection strength between the adjustable buffer member 300c and the crown 400.

Figure 8A:
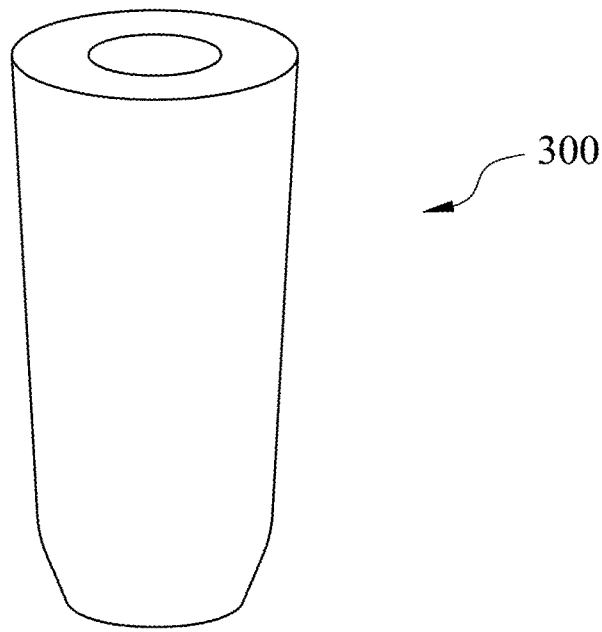
FIG. 8A shows a schematic view of an abutment assembly according to one embodiment of the present disclosure.
Figure 8B:
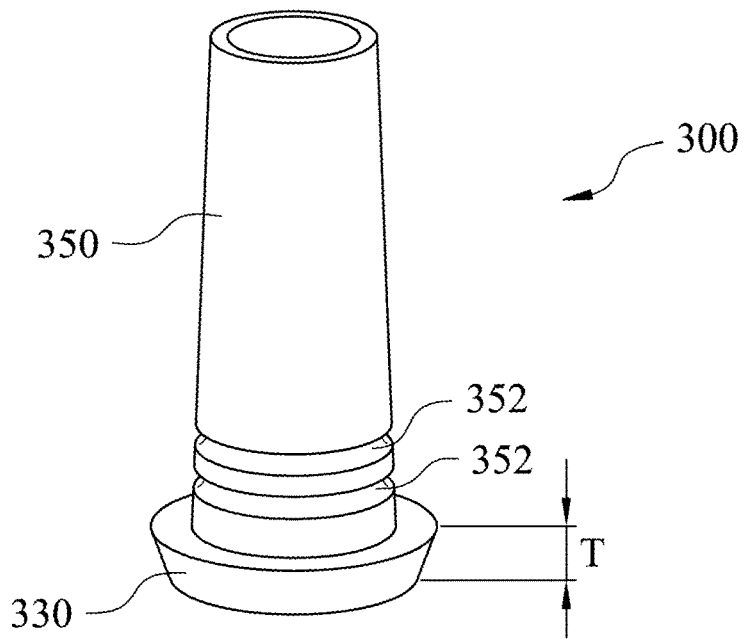
FIG. 8B shows a schematic view of an abutment assembly according to another embodiment of the present disclosure.
Figure 8C:
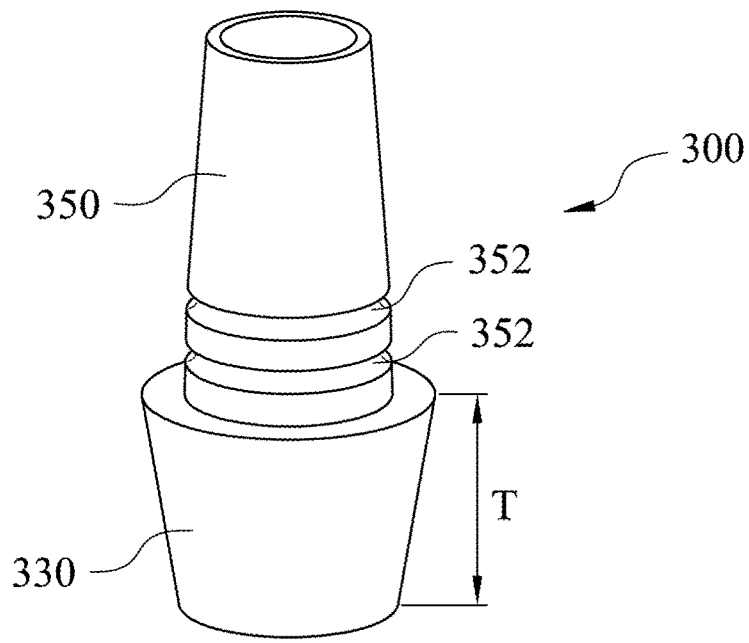
FIG. 8C shows a schematic view of an abutment assembly according to further another embodiment of the present disclosure.
Figure 8D:
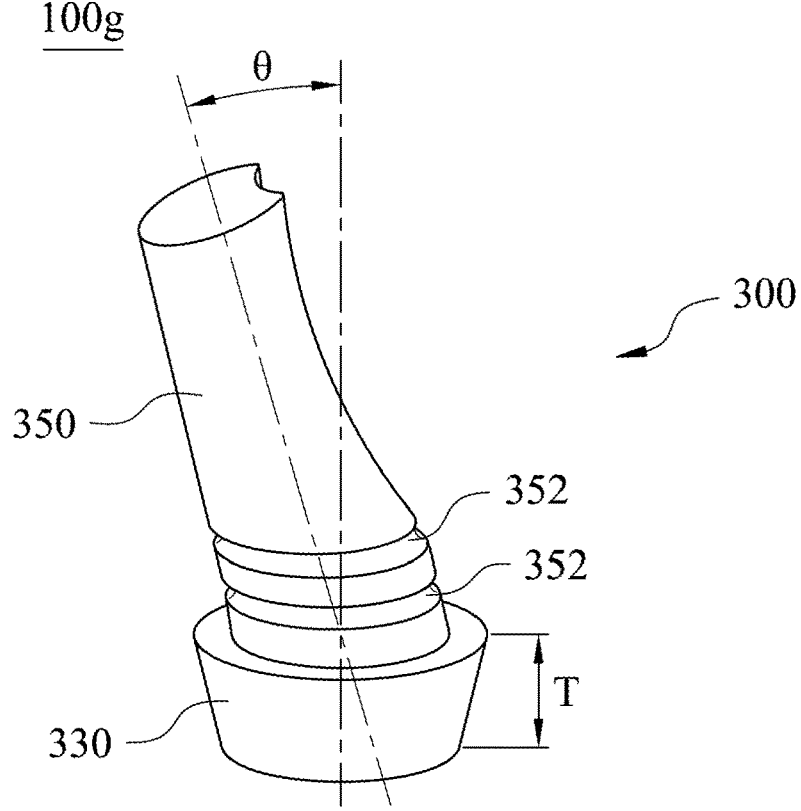
FIG. 8D shows a schematic view of an abutment assembly according to still further another embodiment of the present disclosure.

FIG. 8A shows a schematic view of an abutment assembly 100d according to one embodiment of the present disclosure; FIG. 8B shows a schematic view of an abutment assembly 100e according to another embodiment of the present disclosure; FIG. 8C shows a schematic view of an abutment assembly 100f according to further another embodiment of the present disclosure; and FIG. 8D shows a schematic view of an abutment assembly 100g according to still further another embodiment of the present disclosure. In FIG. 8A, the abutment assembly 100d has a hollow cylindrical shape without grinding or cutting. In FIG. 8B, the abutment assembly 100e includes the adjustable buffer member 300 and a vertical abutment (not shown) disposed in the adjustable buffer member 300. The adjustable buffer member 300 includes a base portion 330 having a base thickness T. The base thickness T is 1 mm. In FIG. 8C, the abutment assembly 100f includes the adjustable buffer member 300 and a vertical abutment (not shown) disposed in the adjustable buffer member 300. The adjustable buffer member 300 includes the base portion 330 having the base thickness T. The base thickness T is 4 mm. In FIG. 8D, the abutment assembly 100g includes the adjustable buffer member 300 and a tilted abutment (not shown) disposed in the adjustable buffer member 300. There is an angle θ between the extending direction of the adjustable buffer member 300 and the Z-axis direction, and the angle θ is about 15 degrees. The adjustable buffer member 300 includes the base portion 330 having the base thickness T. The base thickness T is 2 mm. Accordingly, the abutment assemblies 100e, 100f, 100g and the manufacturing method 700 thereof of the present disclosure can utilize various forms of abutment assemblies to compensate the angle θ between the extending direction of the adjustable buffer member 300 and the Z-axis direction so as to perpendicularly dispose the crown 400 on the adjustable buffer member 300 relative to the gum 106 of patient.

According to the aforementioned embodiments and examples, the advantages of the present disclosure are described as follows.

1. The abutment assembly and the manufacturing method thereof of the present disclosure can stably connect the adjustable buffer member to the abutment via the positioning structure and the engaging structure. In addition, the adjustable buffer member can be faced in the correct direction by grinding or cutting the outer side wall of the adjustable buffer member.

2. The adjustable buffer member combined with a specific color of the coating layer of the present disclosure can be used to compensate the angle between the extending direction of the adjustable buffer member and the Z-axis direction, thereby achieving a desired customized product and aesthetic effects. Moreover, the adjustable buffer member can be used to correct the direction of the crown and avoiding shocking the abutment and the implant.

3. The crown connected to the adjustable buffer member of the present disclosure can smoothly apply the occlusal stress to the abutment, the gum and the implant to reduce the probability of the crown and the abutment being broken, thus increasing the lifetime of the crown and the abutment.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An abutment assembly disposed on an implant and manufactured by an instrument, the abutment assembly comprising:
   an abutment comprising a positioning structure, an upper connecting portion, a lower connecting portion and an interlinking portion, wherein the positioning structure is disposed outside of the upper connecting portion, the interlinking portion is connected between the upper connecting portion and the lower connecting portion, and the lower connecting portion is detachably connected to the implant;
   an adjustable buffer member closely connected to the positioning structure and the upper connecting portion, wherein the adjustable buffer member comprises an engaging structure, an inner side wall, a base portion, an adjusted top surface and a grinding portion, the engaging structure is disposed on the inner side wall and engaged with the positioning structure, the inner side wall is connected to the upper connecting portion and has at least one inner annular groove, the base portion is connected to the grinding portion and disposed on the interlinking portion, the base portion has a base thickness which is greater than 0 mm and smaller than or equal to 4 mm, there is an angle between an extending direction of the adjustable buffer member and a Z-axis direction perpendicular to the adjusted top surface, and the angle is greater than or equal to 0 degrees and smaller than or equal to 30 degrees; and
   an adhesive connected between the abutment and the adjustable buffer member, wherein the adhesive is contained in the inner annular groove, and closely connected to the inner side wall, the upper connecting portion and the interlinking portion;
   wherein the grinding portion of the adjustable buffer member is manufactured by the instrument, and the adjustable buffer member is positioned on the abutment via the positioning structure, the adhesive and the inner annular groove;
   wherein the upper connecting portion has an outer surface, and a recess is formed in the outer surface of the upper connecting portion, the recess extending circumferentially and completely around the upper connecting portion, and the positioning structure is located in the recess.

2. The abutment assembly of claim 1, wherein the adjustable buffer member is made of a material selected from the group consisting of Polymethylmethacrylate (PMMA) and Polyetheretherketone (PEEK).

3. The abutment assembly of claim 1, wherein the adjustable buffer member further comprises:
   an outer side wall comprising at least one outer annular groove, wherein the outer annular groove is located at an outside of the grinding portion, and the outer annular groove is perpendicular to the Z-axis direction.

4. The abutment assembly of claim 3, wherein, the outer side wall comprises two outer annular grooves located at the outside of the grinding portion, and the two outer annular grooves are parallel to each other and perpendicular to the Z-axis direction; and
   the inner side wall comprises two inner annular grooves parallel to each other, and the two inner annular grooves are both communicated with the engaging structure.

5. The abutment assembly of claim 3, wherein the adjustable buffer member is covered by a crown having a crown inner side surface, a binder is configured to connect between the crown inner side surface and the adjustable buffer member, and the binder is contained in the outer annular groove.

6. The abutment assembly of claim 1, wherein the interlinking portion comprises an outer side surface and a coating layer, the coating layer is disposed outside the outer side surface, the coating layer has a gold color, and the coating layer is made of a titanium compound.

7. The abutment assembly of claim 1, wherein the positioning structure has a convex shape, and the engaging structure has a concave shape so as to engage with the positioning structure.

8. The abutment assembly of claim 1, wherein the positioning structure has a concave shape, and the engaging structure has a convex shape so as to engage with the positioning structure.

9. A manufacturing method of the abutment assembly of claim 1, comprising:
   providing a first positioning step, wherein the first positioning step is for closely connecting the engaging structure of the adjustable buffer member to the positioning structure of the abutment so as to position the adjustable buffer member on the abutment;
   providing a grinding step, wherein the grinding step is for grinding the grinding portion of the adjustable buffer member by the instrument; and
   providing a second positioning step, wherein the second positioning step is for closely connecting a crown to the adjustable buffer member by a binder so as to position the crown on the adjustable buffer member.

10. The abutment assembly of claim 1, wherein the positioning structure is formed as a single protrusion, the engaging structure has a concave shape, and the positioning structure is inserted in the engaging structure.

11. An abutment assembly disposed on an implant and manufactured by an instrument, the abutment assembly comprising:
    an abutment comprising a positioning structure, an upper connecting portion, a lower connecting portion and an interlinking portion, wherein the positioning structure is disposed outside of the upper connecting portion, the interlinking portion is connected between the upper connecting portion and the lower connecting portion, the lower connecting portion is detachably connected to the implant, there is an angle between an extending direction of the abutment and a Z-axis direction, and the angle is greater than or equal to 0 degrees and smaller than or equal to 30 degrees;
    an adjustable buffer member closely connected to the positioning structure and the upper connecting portion, wherein the adjustable buffer member comprises a grinding region, an engaging structure, an inner side wall, a base portion, an adjusted top surface and a grinding portion, the adjusted top surface is perpendicular to the Z-axis direction, the grinding region is spaced a tolerance distance from the abutment, the engaging structure is disposed on the inner side wall and engaged with the positioning structure, the inner side wall is connected to the upper connecting portion and has at least one inner annular groove, the base portion is connected to the grinding portion and disposed on the interlinking portion, and the base portion has a base thickness which is greater than 0 mm and smaller than or equal to 4 mm; and an adhesive disposed between the abutment and the adjustable buffer member, wherein the adhesive is contained in the inner annular groove, and closely connected to the inner side wall, the upper connecting portion and the interlinking portion;

wherein the grinding portion of the adjustable buffer member is manufactured by the instrument, the adjustable buffer member is positioned on the abutment via the positioning structure, the adhesive and the inner annular groove, and the tolerance distance is greater than 0 mm;

wherein the upper connecting portion has an outer surface, and a recess is formed in the outer surface of the upper connecting portion, the recess extending circumferentially and completely around the upper connecting portion, and the positioning structure is located in the recess.

12. The abutment assembly of claim 11, wherein the adjustable buffer member is made of a material selected from the group consisting of Polymethylmethacrylate (PMMA) and Polyetheretherketone (PEEK).

13. The abutment assembly of claim 11, wherein the adjustable buffer member further comprises:

an outer side wall comprising at least one outer annular groove, wherein the outer annular groove is located at an outside of the grinding portion, and the outer annular groove is perpendicular to the Z-axis direction.

14. The abutment assembly of claim 13, wherein, the outer side wall comprises two outer annular grooves located at the outside of the grinding portion, and the two outer annular grooves are parallel to each other and perpendicular to the Z-axis direction; and the inner side wall comprises two inner annular grooves parallel to each other, and the two inner annular grooves are both communicated with the engaging structure.

15. The abutment assembly of claim 13, wherein the adjustable buffer member is covered by a crown having a crown inner side surface, a binder is configured to connect between the crown inner side surface and the adjustable buffer member, and the binder is contained in the outer annular groove.

16. The abutment assembly of claim 11, wherein the interlinking portion comprises an outer side surface and a coating layer, the coating layer is disposed outside the outer side surface, the coating layer has a gold color, and the coating layer is made of a titanium compound.

17. The abutment assembly of claim 11, wherein the positioning structure has a convex shape, and the engaging structure has a concave shape so as to engage with the positioning structure.

18. The abutment assembly of claim 11, wherein the positioning structure has a concave shape, and the engaging structure has a convex shape so as to engage with the positioning structure.

* * * * *